(12) United States Patent
Dehennau et al.

(10) Patent No.: US 8,110,137 B2
(45) Date of Patent: Feb. 7, 2012

(54) PROCESS FOR MANUFACTURING A PLASTIC-BASED CELLULAR STRUCTURE

(75) Inventors: Claude Dehennau, Waterloo (BE); Dominique Grandjean, Brussels (BE); Philippe-Jacques Leng, Brussels (BE); Frederic Beullekens, Rixensart (BE)

(73) Assignee: Solvay (Societe Anonyme), Brussels (BE)

( * ) Notice: Subject to any disclaimer, the term of this patent is extended or adjusted under 35 U.S.C. 154(b) by 205 days.

(21) Appl. No.: 12/293,305

(22) PCT Filed: Mar. 22, 2007

(86) PCT No.: PCT/EP2007/052759
§ 371 (c)(1),
(2), (4) Date: Sep. 17, 2008

(87) PCT Pub. No.: WO2007/110370
PCT Pub. Date: Oct. 4, 2007

(65) Prior Publication Data
US 2009/0107621 A1   Apr. 30, 2009

(30) Foreign Application Priority Data

Mar. 29, 2006   (FR) .................................... 06 02705

(51) Int. Cl.
*B29C 51/10* (2006.01)
(52) U.S. Cl. .................. 264/514; 264/555; 264/209.5
(58) Field of Classification Search .................. None
See application file for complete search history.

(56) References Cited

U.S. PATENT DOCUMENTS

| | | | |
|---|---|---|---|
| 3,557,271 A | | 1/1971 | Fairbanks |
| 3,932,106 A | * | 1/1976 | Vogts ............................. 425/505 |
| 4,732,770 A | * | 3/1988 | Welygan et al. ................ 426/94 |
| 5,888,613 A | | 3/1999 | Ketcham et al. |
| 6,277,231 B1 | * | 8/2001 | Ducruy ................... 156/244.15 |
| 6,821,915 B2 | * | 11/2004 | Morman et al. .............. 442/398 |
| 2006/0219354 A1 | | 10/2006 | Dehennau et al. |
| 2008/0193711 A1 | | 8/2008 | Dehennau et al. |
| 2008/0268225 A1 | | 10/2008 | Dehennau et al. |

FOREIGN PATENT DOCUMENTS

| | | |
|---|---|---|
| DE | 1779330 A1 | 9/1971 |
| DE | 3225764 A1 | 1/1984 |
| DE | 3909189 A1 | 11/1989 |
| EP | 1009625 B | 6/2000 |
| EP | 1228977 A | 8/2002 |
| FR | 2583676 A | 12/1986 |
| FR | 2889819 A | 2/2007 |
| WO | WO2006/128837 A1 | 12/2006 |
| WO | WO2007/020279 A1 | 2/2007 |
| WO | WO2007/068680 A1 | 6/2007 |
| WO | WO2008/065061 A1 | 6/2008 |

OTHER PUBLICATIONS

PCT International Search Report dated May 30, 2007 for International Application No. PCT/EP2007/052759 (3 pp.).
PCT International Preliminary Report on Patentability dated Sep. 30, 2008 including the Written Opinion from ISA for International Application No. PCT/EP2007/052759 (6 pp.).
Preliminary Search Report dated Dec. 13, 2006 from Institut National De La Propriete Industrielle for French Application No. 06.02705 (4 pp.).
U.S. Appl. No. 12/063,148, Dehennau, filed Aug. 17, 2006.
U.S. Appl. No. 11/915,770, Dehennau, filed Jun. 24, 2008.
U.S. Appl. No. 12/094,900, Dehennau, filed May 23, 2008.

* cited by examiner

Primary Examiner — Monica A Huson
(74) Attorney, Agent, or Firm — Oblon, Spivak, McClelland, Maier & Neustadt, L.L.P.

(57) ABSTRACT

Process for manufacturing a plastic-based cellular structure comprising:
  a step (a) during which parallel lamellae of a composition based on at least one thermoplastic polymer (P) chosen from amorphous and semi-crystalline polymers are continuously extruded through a die containing a plurality of parallel slots;
  a step (b) during which, on exiting the die and in successive alternations, the spaces between two adjacent lamellae are subjected to an injection of a fluid (f) and to a vacuum, the two sides of a same lamella being, for one side, subjected to the action of the fluid (f) and, for the other side, to the action of the vacuum, and inversely during the following alternation, in order to produce deformation of the lamellae and to weld them in pairs with formation, in a plane approximately parallel to the extrusion direction, of a cellular structure whose constituent cells extend perpendicular to the extrusion direction;
  a step (c) during which the cellular structure obtained in step (b) is drawn perpendicular to the extrusion direction.

10 Claims, No Drawings

PROCESS FOR MANUFACTURING A PLASTIC-BASED CELLULAR STRUCTURE

CROSS-REFERENCE TO RELATED APPLICATIONS

This application is a U.S. national stage application under 35 U.S.C. §371 of International Application No. PCT/EP2007/052759, filed Mar. 22, 2007, which claims priority to French Application No. 06.02705, filed Mar. 29, 2006, all of these applications being herein incorporated by reference in their entirety for all purposes.

The present invention relates to a process for manufacturing a plastic-based cellular structure, more particularly a plastic-based anisometric cellular structure.

A requirement encountered in many (automotive, civil engineering, naval, etc.) industries consists in optimizing the mechanical properties/weight ratio of the structures used. Numerous processes have been developed for achieving this objective, and in particular for lightening plastic structures. Most of these processes use either the mechanical formation of macroscopic cells (by assembly of solid or molten streams in order to form cellular structures known as "honeycomb" structures), or by physical formation of microscopic cells by release or expansion of a gas (expansion or foaming using physical or chemical blowing agents). A combination of the two types of process has also been envisaged.

Processes for manufacturing cellular structures by continuous extrusion have been proposed in the Patent EP-B-1009625 (1) and in Patent Application FR 05/08635 filed on 19 Aug. 2005 (2), the contents of which are incorporated for reference in the present description.

The process described in Patent (1) consists in:
continuously extruding, using a multi-slot die, parallel sheets of thermoplastic material into a cooling chamber, with the creation of a seal between the longitudinal edges of the sheets and the walls of the chamber, the various sheets defining, between themselves and with the walls of the chamber, compartments;
creating, in this chamber and from the end located nearest the die, a vacuum in every other compartment, so as to deform and attract, in pairs, the extruded sheets in order to carry out localized welding over their entire height;
filling, from the end located nearest the die, every other compartment, alternating with the previous compartments, using a coolant that is in practice water; and
alternating, in each compartment, the creation of a vacuum and the filling using a coolant, in order to obtain a solidified cellular structure in the cooling chamber, in which the cells are perpendicular to the extrusion direction.

According to this process, the cellular structures obtained are solid on exiting the cooling chamber and considering, in addition, the presence of a take-off unit downstream from the die, their geometry is such that their longitudinal axis is oriented in the extrusion direction. As a result, the flexural modulus of all the cellular structures is substantially higher in the transverse direction (perpendicular to the extrusion direction) than in the longitudinal direction ("machine" direction, parallel to the extrusion direction), limiting their interest for certain applications and preventing them from being wound onto a reel. This is because when it is desired to bend them longitudinally, they deform transversely, which constitutes a serious practical drawback when long length cellular structures are continuously extruded.

According to the process described in Patent Application (2):
parallel lamellae of a composition based on at least one plastic material are continuously extruded, in an approximately horizontal direction, through a die comprising a plurality of parallel slots located in the immediate vicinity of an insulating material;
on exiting the die, the spaces between two adjacent lamellae are subjected, in successive alternations, to an injection of compressed gas and to a vacuum, the two sides of a same lamella being, for one side, subjected to the action of the compressed gas and, for the other side, to the action of the vacuum, and inversely during the following alternation, in order to produce deformation of the lamellae and to weld them in pairs with formation, in a plane approximately parallel to the extrusion direction, of a cellular structure whose constituent cells extend perpendicular to the extrusion direction;
subjecting said cellular structure, after its formation, to the action of a jet of air.

According to this process, the cellular structures obtained, still in the molten or pasty state on exiting the die, most often have an elliptical cross section, the main axis of which is oriented in the extrusion direction. As a result, the flexural modulus of all the cellular structures is substantially higher in the transverse direction than in the longitudinal direction ("machine" direction); the height of the elliptical surface of revolution forming the wall of each cell is thus limited and generally substantially lower than the longitudinal axis of said cell. The cellular structures obtained according to this process therefore suffer from the same drawbacks as those obtained according to the process described in Patent (1).

The object of the present invention is to solve these problems and especially to make it possible to obtain anisometric cellular structures based on a plastic whose properties are more isotropic, which are less dense than known cellular structures and which may be wound onto a circular reel.

The present invention therefore relates, primarily, to a process for manufacturing a plastic-based cellular structure comprising:
a step (a) during which parallel lamellae of a composition based on at least one thermoplastic polymer (P) chosen from amorphous and semi-crystalline polymers are continuously extruded through a die containing a plurality of parallel slots;
a step (b) during which, on exiting the die and in successive alternations, the spaces between two adjacent lamellae are subjected to an injection of a fluid (f) and to a vacuum, the two sides of a same lamella being, for one side, subjected to the action of the fluid (f) and, for the other side, to the action of the vacuum, and inversely during the following alternation, in order to produce deformation of the lamellae and to weld them in pairs with formation, in a plane approximately parallel to the extrusion direction, of a cellular structure whose constituent cells extend perpendicular to the extrusion direction;
a step (c) during which the cellular structure obtained in step (b) is drawn perpendicular to the extrusion direction.

In the present description, the term "plastic" is understood to mean any amorphous or semi-crystalline thermoplastic polymer (P), including thermo-plastic elastomers and also blends thereof. The term "polymer" is understood to mean both homopolymers and copolymers (especially bipolymers or terpolymers). Examples of such copolymers are, in a non-limiting manner: random copolymers, linear block copolymers, other block copolymers and graft copolymers.

In the present description, the term "amorphous polymer" is understood to mean any thermoplastic polymer (P) predominantly having a disordered arrangement of the macromolecules that form it. In other words, this term is understood to mean any thermoplastic polymer that contains less than 30% by weight, preferably less than 10% by weight of crystalline phase (that is to say, the phase characterized by a melting endotherm during differential thermal analysis (DSC) measurements).

In the present description, the term "semi-crystalline polymer" is under-stood to mean any thermoplastic polymer (P) having, in a large proportion, a chemically and geometrically regular arrangement of the macromolecules that form it. In other words, this term is understood to mean any thermoplastic polymer that contains more than 30% by weight, preferably more than 50% by weight, of crystalline phase (that is to say the phase characterized by a melting endotherm during differential thermal analysis (DSC) measurements).

Two characteristic temperatures are associated with thermoplastic polymers (P): they are the glass transition temperature ($T_g$) and the melting temperature ($T_m$). $T_g$ is the temperature below which a polymer mass has several properties of inorganic glass, including hardness and rigidity. Above the $T_g$, the polymer mass has plastic or elastic properties and it is said to be in the rubbery or elastomeric state. $T_m$ is also called the flow temperature in the case of amorphous polymers and the straightforward melting point when it is a question of semi-crystalline polymers. At the $T_m$ (which is rather, in practice, a temperature zone or range), there is equilibrium between the solid elements and the molten elements of the polymer mass and consequently, in this temperature range, the latter mass is rather a viscous liquid.

Any thermoplastic polymer or copolymer whose $T_m$ is below the decomposition temperature may be used in the process according to the present invention. Synthetic thermoplastics that have a melting range spread over at least 10° C. are particularly well suited. Examples of such materials are those that have a polydispersity of their molecular weight.

It is especially possible to use polyolefins, polyvinyl halides (PVC for example) or polyvinylidene halides (PVDF for example), thermoplastic polyesters, polyarylethersulphones such as polyphenylsulphones (PPSUs), polyketones, polyamides (PA) and copolymers thereof. Polyolefins [and in particular polypropylene (PP) and polyethylene (PE)], polyarylethersulphones such as polyphenylsulphones (PPSUs), PAs, PVCs and PVDFs have given good results.

For the purposes of the present invention, a polyarylethersulphone denotes any polymer of which at least 5% by weight of the repeat units are repeat units (R) corresponding to one or more formulae comprising at least one arylene group, at least one ether group (—O—) and at least one sulphone group [—S(=O)$_2$—].

The polyarylethersulphone may especially be a polybiphenylethersulphone, a polysulphone, a polyethersulphone, a polyimidoethersulphone or else a blend composed of polyarylethersulphones chosen from the aforementioned polyarylethersulphones.

Such polymers that are well suited within the scope of the invention are:
 RADEL® R polyphenylsulphones from Solvay Advanced Polymers, L.L.C. are examples of PPSU homopolymers;
 polysulphone homopolymers sold by Solvay Advanced Polymers, L.L.C. under the trade mark UDEL®; and
 polyethersulphones sold by Solvay Advanced Polymers, L.L.C. under the name RADEL® A.

The composition based on at least one thermoplastic polymer (P) (known hereinafter more simply as "composition") used in the process according to the invention may be formed from a blend of polymers or copolymers or from a blend of polymer material(s) with various additives (stabilizers; plasticizers; inorganic, organic and/or natural or polymer fillers, etc.). This composition may have undergone various treatments such as expansion, orientation, etc. A blowing agent may also be present, enabling expanded or foamed cellular structures to be produced. The blowing agent according to this variant of the present invention may be of any known type. It could be a "physical" blowing agent, that is to say a gas dissolved in the plastic under pressure and which causes the plastic to expand as it leaves the extruder. Examples of such gases are $CO_2$, nitrogen, steam, hydrofluorocarbons or HFCs (such as the 87/13 wt % $CF_3$—$CH_2F$/$CHF_2$—$CH_3$ mixture sold by Solvay as SOLKANE® XG87), hydrocarbons (such as butane and pentane) or a mixture thereof. It may also be a "chemical" blowing agent, that is to say a substance (or a mixture of substances) dissolved or dispersed in the plastic and which, under the effect of the temperature, releases the gas or gases which will be used for the expansion of the plastic. Examples of such substances are azodicarbonamide and mixtures of sodium bicarbonate with citric acid. The latter give goods results.

The amount of blowing agent used in the process according to this variant of the invention must be optimized, especially according to its nature, to the properties (especially dynamic viscosity) of the polymer present and to the desired final density. In general, this content is greater than or equal to 0.1%, preferably 0.5%, or even 1%.

It is understood that the polymers listed above may be added to by other polymers that are compatible or not with the latter and comprise, besides the optional plasticizers, the usual additives used for processing polymers, such as, for example, internal and external lubricants, heat stabilizers, light stabilizers, inorganic, organic and/or natural fillers, pigments, etc.

The implementation of the process according to the invention means that parallel lamellae of the composition based on at least one thermoplastic polymer (P) is extruded continuously during a step (a) through a die containing a plurality of parallel slots. Examples of extrusion devices that are suitable for this implementation are described in the Patent (1) and in the Patent Application (2).

The device described in Patent (1) comprises an extruder feeding the molten composition to a coat-hanger die consisting of several parallel slots each intended for the continuous formation of a lamella, each slot being delimited by two parts in the shape of cones, produced from a thermally insulating material, cut into each of which is a groove.

The device described in the Patent Application (2) essentially comprises:
(A) a sheet die, preferably with an enlarged opening, which feeds the molten composition to knives, for forming the lamellae of molten composition that have to be welded. This die is placed in such a way that the molten composition is extruded in an approximately horizontal direction;
(B) a plurality of knives, which make it possible to form the lamellae of molten composition that have to be welded. These knives may be formed from any materials resistant to the processing temperature of the molten composition. They may be at least partly made from a thermally conductive material such as steel, copper or metal alloys, or at least partly from a thermally insulating material, such as ceramics or polyimide resins optionally reinforced with glass fibres, or any other materials having satisfactory mechanical strength and thermal resistance. Since the front face of the die consists in fact of the abovementioned set of knives, they are either entirely made from a thermally insulating material, or have their downstream end (that is to say their external face) based on or embedded in a thermally insulating material.

These knives are generally positioned in parallel vertical planes and approximately equidistant apart. Between them they define flow channels having, in the flow direction of the molten composition, a convergent first part and thereafter, a substantially straight part, the latter forming the side walls of each constituent slot of the die.

The implementation of the process according to the invention then means carrying out a step (b) during which, on exiting the die and in successive alternations, the spaces between two adjacent lamellae are subjected to an injection of a fluid (f) and to a vacuum, the two sides of a same lamella being, for one side, subjected to the action of the fluid (f) and, for the other side, to the action of the vacuum, and inversely during the following alternation, in order to produce deformation of the lamellae and to weld them in pairs with formation, in a plane approximately parallel to the extrusion direction, of a cellular structure whose constituent cells extend perpendicular to the extrusion direction.

Practical embodiments of step (b) are also described, for example, in Patent (1) and in Patent Application (2).

The embodiment described in Patent (1) is preferred in the case where the fluid (f) is a coolant for the cellular structure in the process of being formed, and is, in particular, water. It means that each groove, cut into each cone-shaped part of each slot of the die, is connected, successively, to a vacuum source and to a coolant source. Shaping of the cellular structure is carried out via two shaping assemblies, consisting of conical parts that are additional to the cone-shaped parts of the die and that are mounted vertically on the die, that is to say in the direction of the cells of the structure that has to be formed, in order to allow control of its thickness. The two shaping assemblies define, by their facing surfaces, the support zones of the two faces of the cellular structure perpendicular to the cells. These surfaces converge from the exit of the die towards a chamber for shaping and cooling the cellular structure, this chamber being tubular with a rectangular cross section and having a height equal to the height of the structure to be obtained, in the direction of the cells of the latter, and having a width equal to that of the structure. A coolant tank from which the fluid is drawn off using a pump, a vacuum pump and a distributor, connected to these two pumps and also to a network connecting it to various compartments located on both sides of the lamellae, intended to successively connect each compartment with the vacuum source and with the coolant source, complete the device that enables the implementation of this embodiment.

The embodiment described in Patent Application (2) is preferred in the case where the fluid (f) is a gas, for example an inert gas, a mixture of inert gases or air. It requires the presence, in the device for extruding the composition, of two short sizing units generally being in the form of metal blocks placed on the front face of the die comprising the slots determined by the vertical knives, the front face which may be coated with a sheet of insulating material as mentioned above. These sizing units are placed on either side of the die slots, one above them and the other below them. They can generally be moved vertically, in opposite directions, in order to define the height of the extruded lamellae and consequently the height of the final cellular structure.

Two chambers are cut out in each of these sizing units, starting from which chambers are tubular ducts that terminate in generally circular orifices emerging near the spaces between the die slots and therefore, during the implementation of the process according to the invention, near the spaces between the extruded lamellae.

Each chamber of each of these sizing units is alternately connected to a vacuum pump or to a compressed gas circuit. Thus, the spaces between two adjacent extruded lamellae are subjected, in successive alternations, to an injection of compressed gas and to a vacuum, the two sides of any one lamella being, for one side, subjected to the action of the compressed gas and, for the other side, to the action of the vacuum, and inversely during the following alternation, in order to produce deformation of the lamellae and weld them in pairs with formation, in a plane approximately parallel to the extrusion direction, of a cellular structure, the constituent cells of which extend perpendicular to the extrusion direction.

Each sizing unit is preferably set at a temperature below $T_{struct}$, but above $T_{struct}$ minus 80° C., preferably above $T_{struct}$ minus 50° C., even above $T_{struct}$ minus 25° C., where $T_{struct}$ is a structural temperature that corresponds to $T_g$ if the composition comprises an amorphous polymer and to $T_m$ if the composition comprises a semi-crystalline polymer.

According to this embodiment, the gas may be heated. The temperature of the gas is preferably greater than or equal to the processing temperature ($T_p$) of the plastic minus 100° C., preferably greater than or equal to $T_p$ minus 50° C., even greater than or equal to $T_p$ minus 20° C.

The practical embodiment of step (b) described in Patent (1) preferably applies to amorphous thermoplastic polymers (P) having a dynamic melt viscosity (measured conventionally via measurements of the shear stress and strain on a rheogoniometer) at their processing temperature (that is to say at the temperature at which they are extruded in order to be converted into cellular structures) and at an angular velocity of 0.1 rad/s of less than 2000 Pa·s, preferably of less than 1000 Pa·s. Preferably, these polymers have, in addition, a $T_g$, measured conventionally by DSC (according to the ISO 11357-2 standard), of less than 60° C., preferably of less than 50° C.

Non-limiting examples of amorphous polymers which may fit the definitions and limitations above are thermoplastic elastomers, and also blends thereof; thermoplastic polyesters and homopolymers and copolymers derived from vinyl chloride, and also blends thereof. Among the homopolymers and copolymers derived from vinyl chloride that can be used, homopolymers and copolymers plasticized by monomeric or polymeric plasticizers are more particularly preferred. As non-limiting examples of such plasticizers, mention may be made of phthalates, sebacates, adipates, trimellitates, pyromellitates, citrates and polyesters such as poly(ε-caprolactone) and blends thereof. These homopolymers and copolymers generally contain at least 10 parts and up to 75 parts by weight of plasticizer per 100 parts by weight of polymer. It is also possible to use vinyl chloride polymers, known as "internal plasticization polymers", that are obtained by copolymerization of vinyl chloride with plasticizer comonomers, such as for example ethylhexyl acrylate, or else by copolymerization with grafting onto the polymers known as "elasticizers" such as poly(ε-caprolactone).

The practical embodiment of step (b) described in Patent Application (2) is preferably applied to thermoplastic polymers (P) having a melt viscosity (measured at the processing temperature and at 0.1 rad/s) greater than or equal to 2500 Pa·s, preferably greater than or equal to 3000 Pa·s. This practical embodiment is also advantageously applied to compositions whose semi-crystalline or amorphous constituent polymer(s) (P) have a glass transition temperature ($T_g$) which may reach and even surpass 80° C., preferably between about 40 and about 60° C. This practical embodiment also gives good results with plastic compositions comprising a blowing agent, such as those mentioned above, which enable expanded or foamed cellular structures to be produced. This is because the fact of using a compressed gas instead of water as the fluid (f) makes it possible, through the least cooling, to improve the drawing of the cells of the foam and by doing this to improve its texture.

The operating conditions for steps (a) and (b) of the process according to the present invention are adapted in particular to the nature of the plastic-based composition. It should especially be ensured that the temperature of this composition at the die exit is adapted so as to be able to weld the cells, to expand the composition where appropriate, etc, in the absence of deformation due to gravity. It should also be ensured that the alternating pressure and vacuum values, and also the duration of the cycles, are adapted so as to optimize this welding. In practice, a pressure greater than or equal to 0.5 bar relative, or even greater than or equal to 1.5 bar, is preferably used. This pressure is generally less than or equal to 6 bar, even less than or equal to 4 bar or even more so less than or equal to 2 bar. As regards the vacuum, this is generally greater than or equal to 100 mmHg absolute, or even greater than or equal to 400 mmHg. Finally, the duration of the cycles (pressure/vacuum alternations) is generally greater than or equal to 0.3 s, even greater than or equal to 0.4 s, and preferably greater than or equal to 0.5 s. This duration is preferably less than or equal to 3 s, even less than or equal to 2 s and even more so less than or equal to 1 s.

The implementation of the process according to the invention may advantageously comprise, after carrying out step (b) and before carrying out step (c), an optional step (b2) during which the cellular structure obtained in step (b) is brought to a temperature ($T_1$) such that $T_g \leq T_1 \leq T_g + 40°$ C., $T_g$ being the glass transition temperature of the thermoplastic polymer (P) if it is amorphous, or brought to a temperature ($T_2$) such that $T_m \geq T_2 \geq T_m - 50°$ C., $T_m$ being the melting point of the thermoplastic polymer (P) (measured according to the ASTM D 3417 standard) if it is semi-crystalline.

Step (b2) may be carried out under static or dynamic conditions, that is to say that it may be carried out on the cellular structure that is immobilized after its extrusion (and its shaping) or on the cellular structure that is kept moving after its extrusion and its shaping. Step (b2) may be carried out by using any known means for heating a plastic: it is possible to use, for example, an electric oven, an oven having a liquid or solid fuel, and it is possible to heat the plastic by irradiation, by infrared radiation, etc.

In the case of an amorphous thermoplastic polymer (P), it is preferred that $T_1$ is between ($T_g + 10°$ C.) and ($T_g + 35°$ C.). If $T_1$ is too low (typically, less than the $T_g$ of the polymer), the polymer is too viscous and if $T_1$ is too high, the polymer is too fluid to be able to be correctly used by the process according to the invention. In the case of a continuous process (step (b2) carried out shortly after step (b)), this variant of the invention generally means reheating the structure after its extrusion (step (b)).

In the case of a semicrystalline thermoplastic polymer (P), it is preferred that $T_2$ is between ($T_m - 10°$ C.) and ($T_m - 40°$ C.). If $T_2$ is too high, the melt behaviour of the polymer does not allow it to be correctly converted into the final cellular structure according to the process of the invention. Typically, it must approach the crystallization temperature of the polymer. In the case of a continuous process, this variant of the invention may be carried out without reheating the structure after its extrusion.

The process according to the invention comprises a step (c) during which the cellular structure, preferably thermally conditioned according to the optional step (b2), is transversely drawn, that is to say drawn perpendicular to the extrusion direction. It should be understood that the process according to the invention is not limited to the successive carrying out, in the stated order, of the optional step (b2) (when it is carried out) and step (c); these steps may be carried out, at least partly, simultaneously, without so much as being outside the scope of the invention. The scope of the invention also extends to the processes in which a cellular structure manufactured continuously according to the successive steps (a) and (b) is first stocked or stored in order to then subject it, successively or, at least partly, simultaneously, to the optional step (b2) and step (c). Finally, the scope of the invention also extends to the processes in which during step (c), successively or simultaneously, a transverse drawing (perpendicular to the extrusion direction) and a longitudinal drawing (parallel to the extrusion direction) are carried out.

Whatever practical embodiment is used for step (c), the transverse draw ratio to which the cellular structure is subjected during step (c), expressed by the ratio of the final working width of the cellular structure after drawing to its initial width, is at least 1.2/1, preferably 1.5/1, particularly 2/1, even 2.5/1. The drawing may be carried out by any known technique. It is possible, for example, to use the drawing lines sold by Brückner Maschinenebau GmbH, in which a transverse drawing and a longitudinal drawing of the cellular structure may be carried out simultaneously or successively. The drawing lines are generally composed of a system of chains on which jaws are placed that clamp the cellular structure via its two side ends and that move apart during the advancement of said cellular structure, as soon as this cellular structure has reached the temperature set in step (b2)—when the latter step is carried out—this temperature possibly being reached, as has already been said, before or during step (c). The term "working width after drawing" is understood to mean the marketable width without the drawing jaws.

The practical drawing conditions, transverse and optionally longitudinal, exerted during step (c), are preferably chosen so that the ratio of the apparent flexural moduli measured on the final cellular structure (three-point bending test according to the ISO 1209-2 standard), parallel to the extrusion direction (longitudinal direction) and perpendicular to the extrusion direction (transverse direction) is less than 10, preferably less than 5, most particularly less than 2. This ratio may even, in the case of cellular structures based on certain semi-crystalline thermoplastic polymers (P), such as PP for example, be less than one. Some routine tests are enough for a person skilled in the art to determine these practical drawing conditions depending on the desired ratio of the apparent moduli.

After the drawing step (c), the thickness of the cellular structure may be levelled out (that is to say that the height of the constituent cells may be made uniform) using any suitable device, such as heated cylinders for example. The cellular structure obtained may be cooled by ambient air, by blowing with a jet of cold air, by spraying with a water mist, etc. A jet of cold air gives good results. After cooling, the edges that have possibly been bitten into by the jaws of the drawing line may be cut off and recycled.

The cellular structure obtained may then be taken up by a take-off unit. The haul-off speed and the extrusion rate will be optimized, especially according to the size and thickness of the cells, and also to the desired shape.

On leaving the take-off unit, the final cellular structure may easily be wound onto a reel. Alternatively, it may be subjected to a surface treatment (a corona treatment, for example), so as to improve the adhesion properties thereof in particular, and to be lined with a nonwoven or with top and bottom facings. At the end of these optional operations, the final panel is cut both lengthwise and widthwise into sheets of the desired dimensions and stored.

The production scrap may be taken up either before the finishing operations, or afterwards, and recycled back into production.

The shape of the cells of the structure formed by the process of the invention is most often approximately polygonal, preferably approximately hexagonal, the sides of the polygon formed being non-isometric, that is to say that the lengths of the sides are unequal.

These generally hexagonal cells most often have a ratio of their length L (in the extrusion direction) to their width l (in the extrusion plane but along a direction perpendicular to that of the extrusion) of less than 2.5, preferably of less than 1.5, even equal to 1.

The length L of the cells is generally greater than or equal to 10 mm, even greater than or equal to 15 mm, but generally less than or equal to 30 mm.

As regards the wall thickness of the cells, this is conditioned by the thickness of the walls of the base cellular structure and by the draw ratios imposed during the transverse and optionally longitudinal drawing. In practice, it is generally greater than or equal to 100 µm, even greater than or equal to 200 or to 250 µm. Advantageously, it does not however exceed 1 mm, even 0.8 and preferably 0.6 mm, so as not to weigh down the structure. The lower limit in fact depends on the embodiment of the die enabling the base cellular structure to be produced and on the draw ratios used.

One of the advantages of the process according to the invention lies in the fact that, whatever the drawing conditions, the thickness of the walls of the drawn cellular structure is not less than 90% of the thickness of the walls of the base cellular structure, preferably it is not less than 95% of this thickness.

It follows from the foregoing that the present invention makes it possible to obtain cellular structures whose length can be varied over a very large measurement, and this being so with a wide range of plastic-based compositions and having adapted compositions.

The cellular structures obtained by the process according to the invention are advantageously used in the building industry (floors, lightweight ceilings, partitions, doors, concrete boxes, etc.), in furniture, in packaging (side protection, wrapping of objects, etc.), in motor vehicles (parcel shelf, door linings, etc.), etc. These structures are particularly suitable for furniture and for buildings, for example for the construction of permanent shelters (habitations) or temporary shelters (rigid tents or humanitarian shelters, for example). They are also suitable as constituents of sports hall floors.

They may be used therein as such, or as sandwich panels, in which they are placed between two sheets called facings. The latter variant is advantageous, and in this case it is possible to manufacture said sandwich panel by welding, bonding, etc., or any other method of assembling the facings and the core (used cold or hot, just after extrusion) that is suitable for plastics. One advantageous way of manufacturing said sandwich panel consists in welding the facings to the cellular core. Any welding process may be suitable for this purpose, processes using electromagnetic radiation giving good results in the case of structures/facings that are at least partially transparent to the electromagnetic radiation. Such a process is described in application FR 03/08843, the content of which is incorporated for this purpose by reference in the present application.

The present invention is illustrated in a non-limiting manner by the following examples:

EXAMPLE 1R

Comparative Example, not According to the Invention

A cellular structure 25 cm in width and 10 mm in height was extruded under the conditions and using the device that are described below:
SCAMEX 45 extruder provided with five separate heating zones (Z1 to Z5) and equipped with a 260 mm width sheet die, equipped with stainless steel knives, the front face of which was coated with a polyimide insulating material, with stainless steel sizing units 18 mm in length, with a compressed air generator and with a vacuum pump. The distance between the knives was 0.3 mm.
Temperature profile in the extruder:
Z1: 130° C.
Z2: 180° C.
Z3: 190° C.
Z4: 190° C.
Z5: 192° C.
Composition: based on PVC, sold by Solvin under the name BENVIC® IR047;
Material temperature at the die inlet: 190° C.;
Temperatures of the die comprising 4 zones:
side cheeks: 192° C.
central zone: 182° C.; and
lips: 192° C.;
Extrusion pressure: 134 bar;
Screw speed: 40 rpm;
Compressed air pressure: 1.2 bar absolute;
Vacuum: 700 mmHg;
Duration of the pressure/vacuum cycles: 1.25 s/1.25 s; and
Longitudinal haul-off speed: 1 m/min.
A cellular structure was obtained having the following properties:
Bulk density: 0.185 kg/dm$^3$;
Length of the cells: 21 mm; and
Width of the cells: 8 mm.
A three-point bending test according to the ISO 1209-2 standard was carried out on this structure, parallel to the extrusion direction and perpendicular to the extrusion direction. The apparent flexural moduli measured were:
parallel to the extrusion direction (longitudinal direction): 2.6 MPa; and
perpendicular to the extrusion direction (transverse direction): 135.6 MPa.
It was therefore seen that the flexural modulus of the cellular structure was substantially higher in the transverse direction than in the longitudinal direction, preventing them from being wound onto a reel, as when it is desired to bend them longitudinally, they deform transversely.

EXAMPLE 2

According to the Invention

The cellular structure formed at the outlet of the device described in Example 1 was drawn transversely on a KARO drawing machine under the following conditions:

Oven temperature: 110° C.;
Material temperature: 107° C.;
Conditioning time: 8 minutes; and
Draw ratio: 100%.
The product obtained had the following characteristics:
bulk density: 0.098 kg/dm$^3$;
length of the cells: 21 mm; and
width of the cells: 16 mm.

A three-point bending test (ISO 1209-2 standard), carried out on this structure parallel and perpendicular to the extrusion direction gave the following results:
flexural modulus measured parallel to the extrusion direction: 12 MPa; and
flexural modulus measured perpendicular to the extrusion direction: 8.7 MPa.

It was therefore seen that the process according to the invention made it possible to obtain a lighter cellular structure, of which the dimensions of the constituent cells were more isometric and of which the flexural moduli in the longitudinal direction and in the transverse direction were of the same order of size, enabling their winding onto a reel.

EXAMPLE 3R

Comparative Example, not According to the Invention

A cellular structure 25 cm in width and 5 mm in height was extruded under the general conditions and with the device described in Example 1R, but under the particular conditions below:
Extrusion pressure: 142 bar;
Compressed air pressure: 1.4 bar absolute;
Duration of the pressure/vacuum cycles: 0.7 s/0.7 s; and
Longitudinal haul-off speed: 1.8 m/min.

A cellular structure having the following properties was obtained:
bulk density: 0.193 kg/dm$^3$;
length of the cells: 22 mm; and
width of the cells: 8 mm.

A three-point bending test (ISO 1209-2 standard), carried out on this structure parallel and perpendicular to the extrusion direction gave the following results:
flexural modulus measured parallel to the extrusion direction: 1.3 MPa; and
flexural modulus measured perpendicular to the extrusion direction: 181.5 MPa.

It was therefore noticed again that the flexural modulus of the cellular structure was substantially higher in the transverse direction than in the longitudinal direction.

EXAMPLE 4

According to the Invention

The cellular structure formed at the outlet of the device described in Example 3R was transversely drawn on a KARO drawing machine under the conditions stated in Example 2.
The product obtained had the following characteristics:
bulk density: 0.108 kg/dm$^3$;
length of the cells: 22 mm; and
width of the cells: 14 mm.

A three-point bending test (ISO 1209-2 standard), carried out on this structure parallel and perpendicular to the extrusion direction gave the following results:
flexural modulus measured parallel to the extrusion direction: 26.8 MPa; and
flexural modulus measured perpendicular to the extrusion direction: 22.5 MPa.

The advantages obtained by the process according to the invention were again seen: lighter cellular structure, more isometric dimensions of the constituent cells, flexural moduli in the longitudinal direction and in the transverse direction of the same order of size.

EXAMPLE 5R

Comparative Example, not According to the Invention

A cellular structure 25 cm in width and 10 mm in height was extruded under the general conditions and with the device described in Example 1R, but under the particular conditions below:
Temperature profile in the extruder:
Z1: 130° C.
Z2: 180° C.
Z3: 190° C.
Z4: 190° C.
Z5: 192° C.
Composition: based on PP, sold by Innovene under the name 201 GB 02;
Material temperature at the die inlet: 180° C.;
Temperatures of the die comprising 4 zones:
side cheeks: 180° C.;
central zone: 180° C.; and
lips: 180° C.;
Extrusion pressure: 95 bar;
Compressed air pressure: 1 bar absolute;
Vacuum: 800 mmHg;
Duration of the pressure/vacuum cycles: 1.9 s/1.9 s; and
Longitudinal haul-off speed: 0.5 m/min.

A cellular structure having the following properties was obtained:
bulk density: 0.108 kg/dm$^3$;
length of the cells: 20 mm; and
width of the cells: 8 mm.

A three-point bending test (ISO 1209-2 standard), carried out on this structure parallel and perpendicular to the extrusion direction gave the following results:
flexural modulus measured parallel to the extrusion direction: 0.2 MPa; and
flexural modulus measured perpendicular to the extrusion direction: 40.3 MPa.

EXAMPLE 6

According to the Invention

The cellular structure formed at the outlet of the device described in Example 5 was transversely drawn on a KARO drawing machine under the following conditions:
Oven temperature: 130° C.;
Material temperature: 127° C.;
Conditioning time: 8 minutes; and
Draw ratio: 100%.
The product obtained had the following characteristics:
bulk density: 0.060 kg/dm$^3$;
length of the cells: 17 mm; and
width of the cells: 17 mm.

A three-point bending test (ISO 1209-2 standard), carried out on this structure parallel and perpendicular to the extrusion direction gave the following results:

flexural modulus measured parallel to the extrusion direction: 1.4 MPa; and flexural modulus measured perpendicular to the extrusion direction: 2.6 MPa.

Once again, this example illustrates the advantages obtained by the process according to the invention, this time in the case of a semicrystalline polymer: the cellular structure is lighter, the dimensions of the cells are more isometric and the flexural moduli in the longitudinal and transverse directions are of the same order of size.

The invention claimed is:

1. A process for manufacturing a plastic-based cellular structure comprising:
   (a) continuously extruding parallel lamellae of a composition comprising at least one thermoplastic polymer (P) chosen from amorphous and semi-crystalline polymers through a die comprising a plurality of parallel slots;
   (b) subjecting spaces between two adjacent lamellae to an injection of a fluid (f) and to a vacuum on exiting the die and in successive alternations, the two sides of a same lamella being, for one side, subjected to the action of the fluid (f) and, for the other side, to the action of the vacuum, and inversely during the following alternation, in order to produce deformation of the lamellae and to weld them in pairs with formation, in a plane approximately parallel to the extrusion direction, of a cellular structure whose constituent cells extend in a plane approximately parallel to but in a direction transverse to the extrusion direction;
   (c) drawing the cellular structure obtained in (b) in a plane approximately parallel to but in a direction transverse to the extrusion direction, wherein the draw ratio transverse to the extrusion direction to which the cellular structure is subjected, expressed by the ratio of the final working width of the cellular structure after drawing to its initial width, is at least equal to 1.2/1.

2. The process according to claim 1, wherein the fluid (f) is a coolant for the cellular structure in the process of being formed.

3. The process according to claim 2, wherein the coolant is water.

4. The process according to claim 1, wherein the fluid (f) is a gas.

5. The process according to claim 1, wherein said process comprises, in addition, (b2) during which the cellular structure obtained in (b) is brought to a temperature ($T_1$) such that $T_g \leq T_1 \leq T_g + 40°$ C., $T_g$ being the glass transition temperature of the thermoplastic polymer (P) if it is amorphous, or brought to a temperature ($T_2$) such that $T_m \geq T_2 \geq T_m - 50°$ C., $T_m$ being the melting point of the thermoplastic polymer (P) if it is semi-crystalline.

6. The process according to claim 5, wherein the thermoplastic polymer (P) is amorphous and wherein the temperature ($T_1$) is such that $$T_g + 10° C. \leq T_1 \leq T_g + 35° C.$$

7. The process according to claim 5, wherein the thermoplastic polymer (P) is semi-crystalline and wherein the temperature ($T_2$) is such that $T_m - 10° C. \leq T_2 \leq T_m - 40°$ C.

8. The process according to claim 1, wherein, during (c) drawing is carried out longitudinally successively or simultaneously to drawing transverse to the extrusion direction.

9. The process according to claim 1, wherein the draw ratio perpendicular to the extrusion direction to which the cellular structure is subjected during step (c), expressed by the ratio of the final working width of the cellular structure after drawing to its initial width, is at least equal to 2/1.

10. The process according to claim 1, wherein the drawing conditions exerted during (c) are chosen so that the ratio of the apparent flexural moduli measured on the final cellular structure in the longitudinal direction and in the transverse direction is less than 10.

* * * * *